May 23, 1967 — W. M. SHOFFNER — 3,321,213
MERCHANDISE CART
Filed Oct. 21, 1965

INVENTOR.
WILLIE M. SHOFFNER

BY
Melvin A. Crosley

United States Patent Office 3,321,213
Patented May 23, 1967

3,321,213
MERCHANDISE CART
Willie M. Shoffner, 318 S. Lutheran Church Road,
New Lebanon, Ohio 45445
Filed Oct. 21, 1965, Ser. No. 500,027
5 Claims. (Cl. 280—47.34)

This invention relates to a merchandise cart and is particularly concerned with a novel arrangement of the wheels of a merchandise cart.

Carts of the nature with which the present invention is concerned are utilized in retail outlets of the self service type, for example, groceries, hardware stores and the like where the customer goes about with a wheeled cart and selects the merchandise which he wishes to purchase and then conveys it to a check-out counter where the merchandise is checked out by a register operator and the total calculated and payment made for the merchandise.

A number of retail outlets of this nature are carpeting the establishments and this has created certain problems in connection with the movement of the carts. The carts for carpeted floors have been provided with larger wheels and harder outer peripheries and this assists somewhat in the manipulation of the carts over carpeted floors. With the carts having all four wheels of the swivelling caster type they become extremely difficult to manipulate properly on carpeting and are even sometimes difficult to manipulate on tile or hard floors because of the tendency of one or more of the wheels to resist movement into a predetermined position.

A number of the carts employed have non-swivelling wheels at the back and caster type or swivelling wheels at the front and these carts have certain advantages over the four caster wheel types because the non-swivelling rear wheels will impart stability to the carts.

The carts having both rear wheels non-swivelling however, present certain difficulties in connection with manipulating the cart and particularly on carpeted floors and, most particularly, when it is desired to bring the carts into proper position at the check-out counter.

The present invention deals in particular with the problems referred to above and the primary object of the present invention is provision of a merchandise cart of the nature referred to which avoids all of the drawbacks referred to above.

A particular object of the present invention is the provision of a merchandise cart with a wheel arrangement of such a nature that the cart is easily manipulatable on either hard or carpeted floors and, particularly, in connection with bringing the cart into proper position at the check-out counter.

A still further object of the present invention is the provision of a readily manipulatable merchandise cart in which ease of manipulation can be imparted to the cart without any substantial increase in the price of the cart.

The nature of the present invention will be more fully comprehended upon reference to the following specification taken in connection with the accompanying drawings in which.

Figure 1:
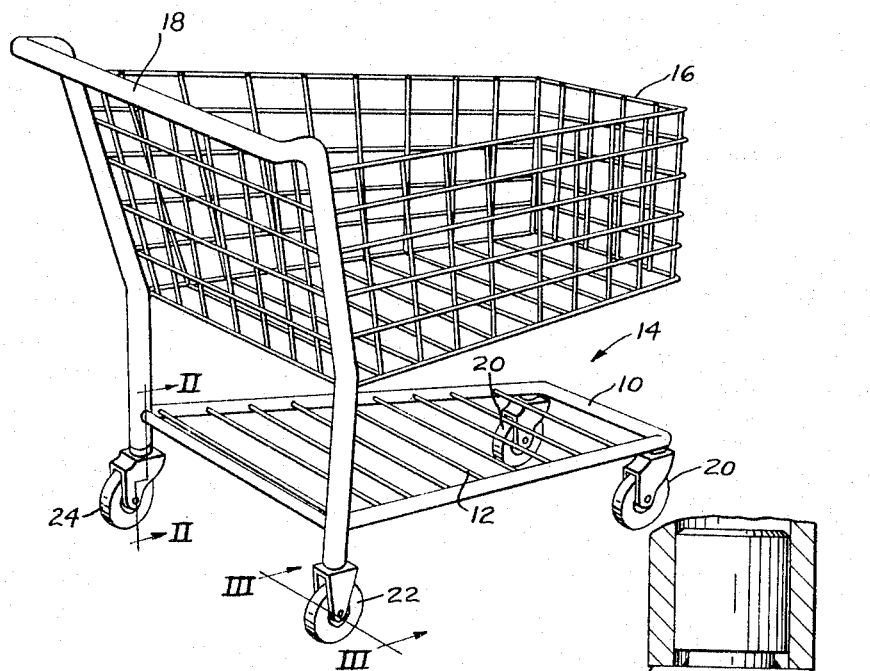
FIGURE 1 is a perspective view of a merchandise cart constructed according to my invention.

Referring to the drawings somewhat more in detail the cart, which is somewhat schematically illustrated in FIGURE 1, may comprise a tubular metal frame 10 having bars 12 at the bottom defining a lower deck 14 for receiving large bags and boxes and cartons and the like. The upper portion of the frame has a basket 16 thereon into which small articles not suitable for placing on the lower deck 14 are received.

The cart comprises a handle 18 forming a part of frame 19 by means of the cart is moved about. At the bottom of the frame there are provided front wheels 20, and rear wheels 22, on the right, and 24 on the left. Front wheels 20 are of the caster type and are arranged to swivel in a substantially conventional manner. These wheels may be on the order of about five inches in diameter and may be provided with soft covers or hard covers. For hard floors the soft rubber-like covers are generally employed while on carpeted floors a harder cover, or an entirely hard wheel, as of plastic material, is provided.

The present invention is particularly concerned with the arrangement of the rear wheels. In FIGURE 1 it will be noted that wheel 22 to the right side is a non-swivelling type wheel whereas wheel 24 at the left side of the cart is a swivel type wheel. The structures of the wheels and the swivelling arrangements therefore is shown in section in FIGURES 2 and 3. In these figures it will be noted that wheel 24 comprises a swivel means 26 so that it is constructed similarly to front wheels 20 and it will swing about its swivel support depending on the direction of movement of the cart.

It has been found that the described arrangement of the wheels is highly effective for imparting ease of manipulation to the cart. The non-swivelling rear wheel 22 at the right imparts stability to the cart so that it does not tend to move off at an angle as often occurs with carts having four swivel wheels whereas the single swivelling rear wheel at 24 provides that the cart will meet the minimum amount of hindrance to movement thereof because of irregularities in the floor or carpet over which the cart is being moved.

The selection of the right rear wheel of the cart as the non-swivelling wheel and the left rear wheel as the swivelling wheel is dictated by the arrangement of the check-out counter. In most instances the cart is brought up to the right side of the check-out counter so that the check-out counter is on the left side of the cart. In instances where the check-out counter is to the right of the cart, the left rear wheel would be the non-swivelling wheel and the right wheel would be the swivelling wheel.

In any case, the swivelling rear wheel on the check-out counter side of the cart permits the cart readily to be moved laterally into proper alignment or engagement with the check-out counter when goods in the cart are to be removed therefrom.

Figure 2:
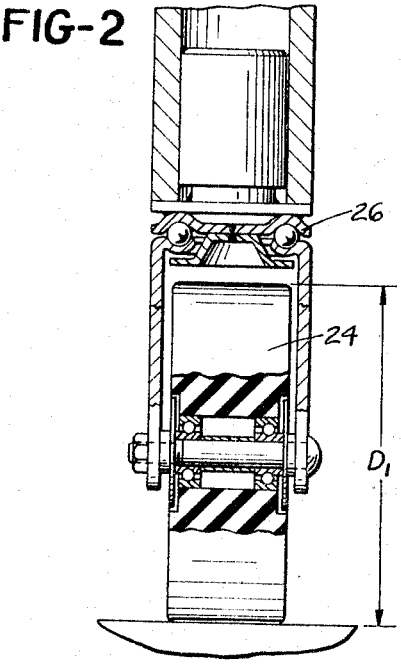
FIGURE 2 is a vertical section view indicated substantially by section line II—II on FIGURE 1.
Figure 3:
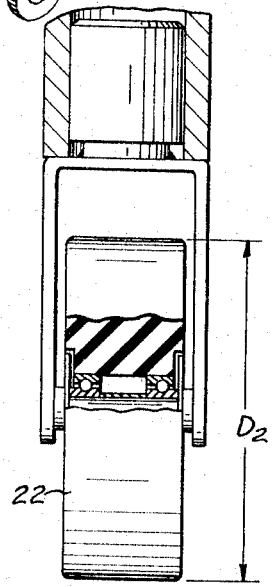
FIGURE 3 is a vertical sectional view substantially indicated by reference line III—III on FIGURE 1.

In this connection it is to be noted that, as seen in FIGURE 2, the diameter of wheel 24, which is given as D1 and the diameter of wheel 22, which is given as D2, are slightly different; wheel 24 being a little larger than wheel 22. This may be accomplished, for example, by making wheel 22 slightly undersize. With the non-swivelling rear wheel slightly undersize it becomes very easy to move the cart laterally toward the side on which the swivelling rear wheel is mounted. This comes about because, while the frame 10 of the cart is relatively stiff, it will yield slightly under lead to permit wheel 22 to carry its fair share of the load. When the handle 18 of the cart is pushed leftwardly to move the cart toward the checkout counter, however, this will tend to take the load off wheel 22 and it will either lift from the floor or slide very easily thereon while the other three wheels on the cart carry substantially the entire load thereof.

If the check-out counter is on the right side of the cart, of course, the left rear wheel will be made the non-swivelling one and would be slightly smaller than the swivelling rear wheel and the same results would obtain except the cart would be moved rightwardly to engage the check-out counter.

It has been found that the cart when fully loaded becomes much more easy to move about by the practice of the present invention, and, as mentioned, particularly in connection with bringing the cart in the proper position relative to the check-out counter.

I have found that, instead of making the non-swivelling back wheel smaller than the other back wheel, it can be mounted in the frame so the bottom thereof is slightly higher than the bottom of the other back wheel. This can be done, for example, by making the support bracket of the roller smaller.

When the cart is loaded, all four wheels rest on the floor and carry the load. Pushing the cart toward the swivelling back wheel, however, will relieve this non-swivelling back wheel of at least part of its load so the cart will move easily as described above.

It will be understood that this invention is susceptible to modification in order to adapt it to different usages and conditions; and accordingly, it is desired to comprehend such modifications within this invention as may fall within the scope of the appended claims.

I claim:

1. In a merchandise cart; a cart frame having means thereon for receiving articles of merchandise, said frame being slightly flexible so as to be twistable under a predetermined force, front wheels and back wheels on the bottom of said frame, said front wheels and one of said back wheels being of the swivelling caster type and the other said back wheel being a non-swivelling type wheel, the bottom of said non-swivelling back wheel being normally slightly higher than the bottom of said swivelling back wheel, said frame being sufficiently resilient under a normal load of merchandise therein to permit said non-swivelling back wheel normally to assume its share of the load of the cart and the merchandise therein while movement of the cart laterally toward the swivelling back wheel will cause the frame to flex somewhat and reduce the load on the said non-swivelling back wheel.

2. In a merchandise cart; a frame having basket means thereon to receive merchandise to be moved about in the cart, said frame having a handle at the top for manipulation of the cart and having a pair of front wheels and a pair of back wheels at the bottom, said front wheels and one of said back wheels being of swivelling caster type and the other said back wheel being a non-swivelling type wheel, the bottom of said non-swivelling type back wheel normally being slightly higher than the bottom of the other back wheel, and said frame being at least slightly flexible so that when the cart is loaded and is moved in the normal manner by said handle, both back wheels will assume their proper share of the load of the cart whereas upon movement of the cart laterally toward the swivelling type back wheel by use of the said handle, a substantial portion of the load will be removed from the non-swivelling type rear wheel and the cart will therefore move readily in the lateral direction toward the swivelling type back wheel even when the cart is carrying a substantial load.

3. A merchandise cart according to claim 2 in which the non-swivelling type back wheel is on the right side of the cart when viewed from the rear thereof.

4. A merchandise cart according to claim 2 in which the non-swivelling type back wheel is slightly smaller in diameter than the other back wheel.

5. A merchandise cart according to claim 2 in which the non-swivelling type back wheel is so mounted in the frame that the bottom thereof is higher than the bottom of said other back wheel.

References Cited by the Examiner
UNITED STATES PATENTS

| | | | |
|---|---|---|---|
| 1,339,109 | 5/1920 | Irrgang | 280—79.1 |
| 2,890,057 | 6/1959 | Davis | 280—33.99 |
| 3,186,728 | 6/1965 | Turlington | 280—33.99 |
| 3,233,912 | 2/1966 | Chusid et al. | 280—47.34 |

MILTON BUCHLER, *Primary Examiner.*

C. C. PARSONS, *Assistant Examiner.*